United States Patent
Kasai et al.

(10) Patent No.: US 8,748,849 B2
(45) Date of Patent: Jun. 10, 2014

(54) SCINTILLATOR PANEL

(75) Inventors: Shigetami Kasai, Hino (JP); Hiroshi Isa, Hino (JP); Makoto Iijima, Isehara (JP); Yasushi Nagata, Kodaira (JP)

(73) Assignee: Konica Minolta Medical & Graphic, Inc. (JP)

( * ) Notice: Subject to any disclaimer, the term of this patent is extended or adjusted under 35 U.S.C. 154(b) by 164 days.

(21) Appl. No.: 13/130,795

(22) PCT Filed: Nov. 11, 2009

(86) PCT No.: PCT/JP2009/069176
§ 371 (c)(1),
(2), (4) Date: May 24, 2011

(87) PCT Pub. No.: WO2010/061727
PCT Pub. Date: Jun. 3, 2010

(65) Prior Publication Data
US 2011/0248186 A1 Oct. 13, 2011

(30) Foreign Application Priority Data
Nov. 28, 2008 (JP) ................. 2008-303999

(51) Int. Cl.
*G01T 1/20* (2006.01)
*G21K 4/00* (2006.01)
(52) U.S. Cl.
CPC .............. *G01T 1/20* (2013.01); *G21K 2004/06* (2013.01)
USPC .................. 250/483.1; 250/472.1; 250/473.1; 427/157
(58) Field of Classification Search
CPC .............................. G01T 1/20; G21K 2004/06
USPC ................ 250/483.1, 472.1, 473.1; 427/157; 252/301.4 H
See application file for complete search history.

(56) References Cited

U.S. PATENT DOCUMENTS 4,879,202 A 11/1989 Hosoi et al.
6,780,648 B1 * 8/2004 Sun ............................... 436/172
(Continued)

FOREIGN PATENT DOCUMENTS

EP 1435629 A2 7/2004
JP 54-35060 B2 10/1979
(Continued)

OTHER PUBLICATIONS

International Search Report for International Application No. PCT/JP20089/069176 with English translation mailed Dec. 8, 2009.
(Continued)

*Primary Examiner* — David Porta
*Assistant Examiner* — Abra Fein
(74) *Attorney, Agent, or Firm* — Cantor Colburn LLP

(57) ABSTRACT

A scintillator panel which is capable of obtaining a radiation image exhibiting enhanced luminance and sharpness and achieving improved storage stability is disclosed, comprising on a support a base layer and a phosphor layer provided sequentially in this order, wherein the phosphor layer comprises (columnar) phosphor crystals formed of a phosphor parent compound and an activator by a process of vapor phase deposition and the base layer comprises crystals formed of the phosphor parent compound and an activator, and a relative density of the base layer is lower than a relative density of the phosphor layer and a relative content of an activator of the base layer is lower than a relative content of an activator of the phosphor layer.

8 Claims, 1 Drawing Sheet

(56) References Cited

U.S. PATENT DOCUMENTS

| | | | |
|---|---|---|---|
| 2005/0173645 A1* | 8/2005 | Endo | 250/370.11 |
| 2008/0023648 A1* | 1/2008 | Sakai et al. | 250/483.1 |
| 2008/0083877 A1* | 4/2008 | Nomura et al. | 250/370.11 |
| 2008/0099694 A1* | 5/2008 | Shoji et al. | 250/483.1 |
| 2008/0217550 A1* | 9/2008 | Shoji et al. | 250/370.11 |

FOREIGN PATENT DOCUMENTS

| | | | |
|---|---|---|---|
| JP | 63-215987 A | 9/1988 |
| JP | 2005-91222 A | 4/2005 |
| JP | 2006-250909 A | 9/2006 |
| JP | 2008-51793 A | 3/2008 |

OTHER PUBLICATIONS

Extended European Search Report for Application No. 09828975.4-1355/2369596 dated May 24, 2013.

* cited by examiner

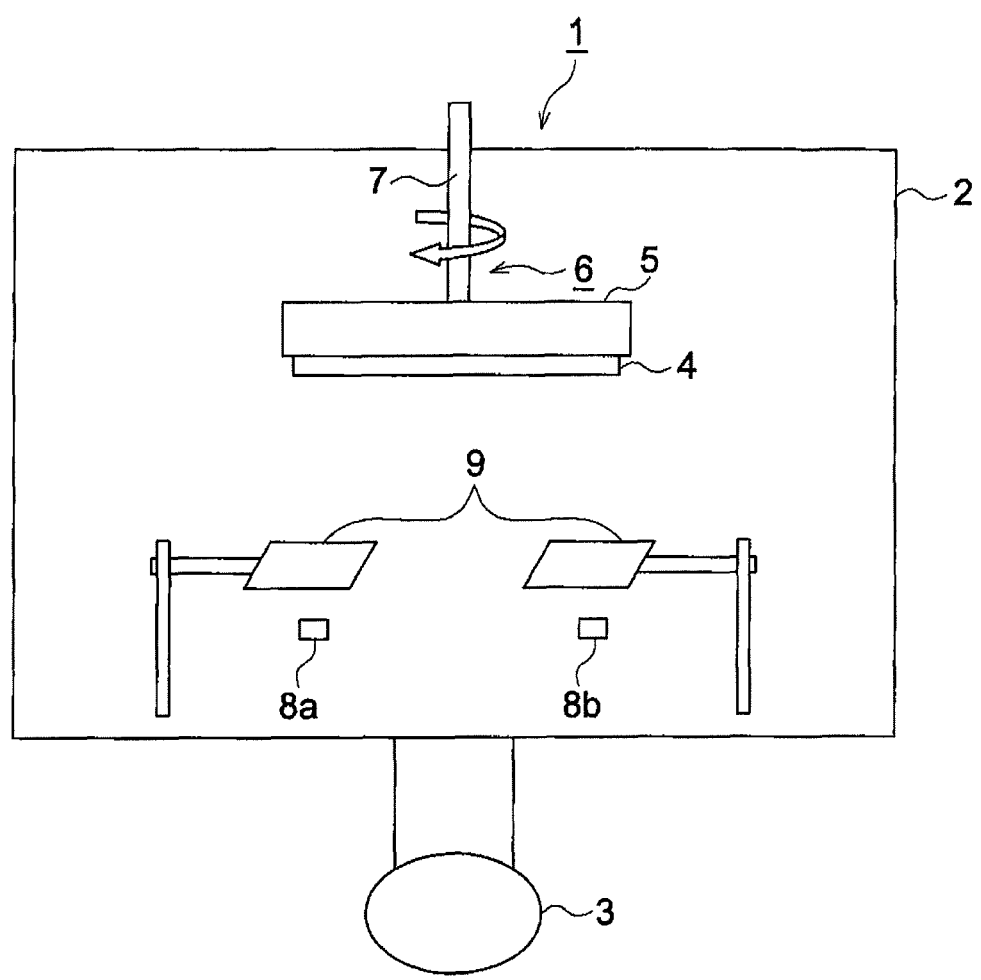

SCINTILLATOR PANEL

This is a U.S. national stage application of International Application No. PCT/JP2009/069176, filed on 11 Nov. 2009. Priority under 35 U.S.C. 119(a) and 35 U.S.C. 365(b) is claimed from Japanese Application No. JP 2008-303999, filed 28 Nov. 2008, the disclosure of which is also incorporated herein by reference.

TECHNICAL FIELD

The present invention relates to a scintillator plate exhibiting enhanced sensitivity and sharpness and capable of obtaining radiation images of excellent storage stability.

TECHNICAL BACKGROUND

There have been broadly employed radiographic images such as X-ray images for diagnosis of the conditions of patients on the wards. Specifically, radiographic images using an intensifying-screen/film system have achieved enhancement of speed and image quality over its long history and are still used on the scene of medical treatment as an imaging system having high reliability and superior cost performance in combination. However, these image data are so-called analog image data, in which free image processing or instantaneous image transfer cannot be realized.

Recently, there appeared digital system radiographic image detection apparatuses, as typified by a computed radiography (also denoted simply as CR) and a flat panel detector (also denoted simply as FPD). In these apparatuses, digital radiographic images are obtained directly and can be displayed on an image display apparatus such as a cathode tube or liquid crystal panels, which renders it unnecessary to form images on photographic film. Accordingly, digital system radiographic image detection apparatuses have resulted in reduced necessities of image formation by a silver salt photographic system and leading to drastic improvement in convenience for diagnosis in hospitals or medical clinics.

The computed radiography (CR) as one of the digital technologies for radiographic imaging has been accepted mainly at medical sites. However, image sharpness is insufficient and spatial resolution is also insufficient, which have not yet reached the image quality level of the conventional screen/film system. Further, there appeared, as a digital X-ray imaging technology, an X-ray flat panel detector (FPD) using a thin film transistor (TFT), as described in, for example, the article "Amorphous Semiconductor Usher in Digital X-ray Imaging" described in Physics Today, November, 1997, page 24 and also in the article "Development of a High Resolution, Active Matrix, Flat-Panel Imager with Enhanced Fill Factor" described in SPIE, vol. 32, page 2 (1997).

To convert radiation to visible light is employed a scintillator panel made of an X-ray phosphor which is emissive for radiation. The use of a scintillator panel exhibiting enhanced emission efficiency is necessary for enhancement of the SN ratio in radiography at a relatively low dose. Generally, the emission efficiency of a scintillator panel depends of the phosphor layer thickness and X-ray absorbance of the phosphor. A thicker phosphor layer causes more scattering of emission within the phosphor layer, leading to deteriorated sharpness. Accordingly, necessary sharpness for desired image quality level necessarily determines the layer thickness.

Specifically, cesium iodide (CsI) exhibits a relatively high conversion rate of X-rays to visible light. Further, a columnar crystal structure of the phosphor can readily be formed through vapor deposition and its light guide effect inhibits scattering of emitted light within the crystal, enabling an increase of the phosphor layer thickness (as described in patent document 1).

However, the use of cesium iodide (CsI) alone results in reduced emission efficiency. For example, there was disclosed a technique for use as an X-ray phosphor in which a mixture of cesium iodide (CsI) and sodium iodide (NaI) at any mixing ratio was deposited on a support (substrate) to form sodium-activated cesium iodide (CsI:Na); recently, there was also disclosed a technique in which a mixture of cesium iodide (CsI) and thallium iodide (TlI) at any mixing ratio was deposited on a substrate to form thallium-activated cesium iodide (CsI:Tl), which was further subjected to a heat treatment at a temperature of 200 to 500° C. to achieve enhanced visible-conversion efficiency to employ as an X-ray phosphor (as described in patent document 2).

However, such an activator was different in crystal structure from cesium iodide, so that its increased content resulted in disorder of a columnar crystal structure, producing problems such as deterioration of sharpness.

There was further disclosed a panel in which a sublayer comprising a phosphor parent compound (CsBr) and exhibiting a lower density than a phosphor layer was provided, resulting in superior adhesiveness between a phosphor and a support and leading to enhanced sensitivity (as described in patent document 3). However, it was proved that such a technique was insufficient in sensitivity and inferior in moisture resistance.

CITATION LIST

Prior Art Document

Patent document 1: JP 63-215987A
Patent document 2: JP 54-35060B
Patent document 3: JP 2005-091222A

SUMMARY OF THE INVENTION

Problems to be Solved

The present invention has come into being in view of the foregoing problems and circumstances and it is an object of the present invention to provide a scintillator panel capable of obtaining a radiation image exhibiting enhanced luminance and sharpness, and achieving improved storage stability.

Means for Solving the Problems

The foregoing problems related to the present invention can be solved by the following constitution.

1. A scintillator panel comprising on a support a base layer and a phosphor layer provided sequentially in this order, wherein the phosphor layer comprises columnar phosphor crystals formed of a phosphor parent compound and an activator by a process of vapor phase deposition and the base layer comprises crystals formed of the phosphor parent compound and an activator, and a relative density of the base layer is lower than that of the phosphor layer and a relative amount of an activator contained in the base layer is lower than that of an activator contained in the phosphor layer.

2. The scintillator panel, as described in the foregoing 1, wherein a thickness of the base layer satisfies the following expression:

Expression 0.01<[(thickness of base layer)/(thickness of phosphor layer)]<0.5.

3. The scintillator panel, as described in the foregoing 1 or 2, wherein the base layer is a layer comprising crystals formed by a process of vapor phase deposition.

4. The scintillator panel, as described in any of the foregoing 1 to 3, wherein the phosphor parent compound is cesium iodide (CsI) and the activator is thallium (Tl).

Effect of the Invention

According to the present invention, there can be provided a scintillator panel which can obtain a radiation image exhibiting enhanced luminance and sharpness, and can achieve improved storage stability.

BRIEF DESCRIPTION OF THE DRAWING

FIG. 1 illustrates a schematic depiction of a production device of a scintillator panel.

PREFERRED EMBODIMENTS OF THE INVENTION

The scintillator panel of the present invention is featured in that the scintillator panel comprises a base layer and a phosphor layer provided on a support sequentially in this order, wherein the phosphor layer is comprised of columnar phosphor crystals which have been formed of a phosphor parent compound and an activator by a process of vapor phase deposition and the base layer is comprised of crystals which have been formed of the phosphor parent compound and an activator, and the density of the base layer is relatively lower to that of the phosphor layer and the content of an activator of the base layer is relatively lower to that of the phosphor layer. This feature is a technical feature in common with the foregoing 1 to 4.

In one preferred embodiment of the present invention, the thickness of the base layer meets the relational expression described below:

Expression: $0.01 < [(\text{thickness of base layer})/(\text{thickness of phosphor layer})] < 0.5$.

Further, the base layer is preferably comprised of crystals formed by a process of vapor phase deposition. Furthermore, the phosphor parent compound preferably is cesium iodide (CsI) and the activator preferably is thallium (Tl).

Hereinafter, there will be detailed the present invention and its constituent features and preferred embodiments.

In the present specification, the numerical range represented by use of the designation "-" represents the range including numerical values described before and after "-", as lower and upper limits.

Constitution of Scintillator Panel:

The scintillator panel of the present invention is one which is provided on a support with a base layer and a phosphor layer sequentially in that order, wherein the phosphor layer comprises columnar phosphor crystals which were formed of a phosphor parent compound and an activator by a process of vapor phase deposition and the base layer comprises crystals formed of the phosphor parent compound and an activator, and the relative density of the base layer is lower than that of the phosphor layer and a relative amount of an activator contained in the base layer is lower than that of an activator contained in the phosphor layer.

Hereinafter, there will be described typical examples of various constituent layers and elements forming a scintillator panel.

Phosphor Layer and Base Layer:

A phosphor layer related to the present invention (which is also denoted as a scintillator layer) is mainly composed of a commonly known phosphor parent compound such as a cesium halide, for example, cesium iodide (CsI) or cesium bromide (CsBr), which is preferably a phosphor layer containing phosphor columnar crystals composed of cesium iodide (CsI) as a parent compound (main component). A material to form a phosphor layer may employ a variety of commonly known phosphor materials, of which cesium iodide (CsI) is employed as a main component in the present invention, since it exhibits an enhanced conversion rate of X-rays to visible light and readily forms a columnar crystal structure of a phosphor, whereby scattering of emitted light within the crystal is inhibited through the light guiding effect, rendering it feasible to increase the scintillator layer thickness.

CsI by itself exhibits a relatively low emission efficiency, so that various activators are incorporated. For example, JP 54-35060B disclosed a mixture of CsI and sodium iodide (NaI) at any mixing ratio. Further, JP 2001-59899A disclosed vapor deposition of CsI containing an activator, such as thallium (Tl), europium (Eu), indium (In), lithium (Li), potassium (K), rubidium (Ru) or sodium (Na). In the present invention, thallium (Tl) is preferred.

In the present invention, it is preferred to employ, as raw materials, cesium iodide and an additive containing at least one thallium compound. Namely, thallium-activated cesium iodide (denoted as CsI:Tl), which exhibits a broad emission within the wavelength region of from 400 to 750 nm, is preferred.

There can be employed various thallium compounds (compound having an oxidation number of +I or +III) as a thallium compound contained in such an additive.

In the present invention, the thallium compound preferably is a thallium iodide (TlI).

The melting point of a thallium compound related to the present invention is preferably in the range of 400 to 700° C. A melting point higher than 700° C. results in nonhomogeneous inclusions of an additive within the columnar crystal. In the present invention, the melting point is at ordinary temperature and ordinary pressure.

In the present invention, the relative activator content of the phosphor layer is preferably from 0.1 to 5 mol %. The relative activator content of a base layer is preferably from 0.01 to 1 mol %, and more preferably from 0.1 to 0.7 mol %. The relative activator content is represented by mol % of an activator, based on 1 mol of a phosphor parent compound. Specifically, a base layer containing not less than 0.01 mol % is essential in terms of enhancement of emission luminance and storage stability. In the present invention, it is necessary that a relative activator content of the base layer is lower than that of the phosphor layer, and the ratio of relative activator content of the base layer to the relative activator content of the phosphor layer, that is, (relative activator content of base layer)/(relative activator content of phosphor layer) is preferably from 0.1 to 0.7 mol %.

The thickness of a phosphor layer (scintillator layer) is preferably from 100 to 800 μm, and more preferably from 120 to 700 μm to achieve balanced characteristics of luminance and sharpness.

The phosphor columnar crystals related to the present invention need to be formed by a process of vapor phase deposition. The process of vapor phase deposition may employ a vapor deposition method, a sputtering method, a CVD method, an ion plating method and the like, and the vapor deposition method is preferred in the present invention.

In the present invention, the scintillator panel comprises a support and thereon a phosphor layer formed by the process of vapor phase deposition, in which the phosphor layer is composed of a phosphor parent compound and an activator, and between the support and the phosphor layer is provided a base layer which is composed of the phosphor parent compound and the activator and exhibits a relative density lower than that of the phosphor layer and the relative activator content is lower than that of the phosphor layer.

Further, the method of producing the scintillator panel of the present invention is preferably one which comprises the steps of forming on a support a base layer exhibiting relatively lower activator content to the phosphor layer, and depositing the phosphor on the base layer by the process of vapor phase deposition to form a phosphor layer exhibiting relatively higher activator content than the base layer.

The presence of the base layer results in enhanced columnar crystallinity of the phosphor layer, leading to increased emission, enhanced luminance of the panel, and improved storage stability.

The base layer as a characteristic requirement of the present invention exhibits a relative activator content lower than that of the phosphor layer and the relative density of the base layer is preferably within the range of 85 to 95%.

In the present invention, the relative density of the base layer is required to be lower than the relative density of the phosphor layer and the ratio of relative density of the base layer to relative density of the phosphor layer [that is, (relative density of base layer)/(relative density of phosphor layer)] is preferably from 0.92 to 0.98.

In the present invention, the relative density (%) represents a relative value (expressed in percentage) of the ratio of a real density ($g/cm^3$) of the individual layer (base layer or phosphor layer) to an intrinsic density of a phosphor (or a density inherent to a phosphor, $g/cm^3$).

The ratio of base layer thickness to phosphor layer thickness desirably satisfies the relational expression described below. For example, when the thickness of a phosphor layer is 500 μm, the thickness of a base layer preferably is more than 5 μm and less than 250 μm.

Expression 0.01<(thickness of base layer)/(thickness of phosphor layer)<0.5

In the present invention, the base layer preferably is also formed by the process of vapor phase deposition similarly to the phosphor layer. When formed by the process of vapor phase deposition such as vapor deposition, the base layer is generally formed of an aggregate of spherical crystals with some μms diameters or has a columnar crystal structure.

Reflection Layer:

In the present invention, there may be provided a reflection layer (also denoted as a metal reflection layer) on the support (substrate). The reflection layer reflects light emitted from a phosphor (scintillator), resulting in enhanced light-extraction efficiency. The reflection layer is preferably formed of a material containing an element selected from the group consisting of Al, Ag, Cr, Cu, Ni, Ti, Mg, Rh, Pt, and Au.

It is specifically preferred to employ a metal thin-film composed of the foregoing elements, for example, Ag film or Al film. Such a metal film may be formed of two or more layers. The thickness of a reflection layer is preferably 0.005 to 0.3 μm in terms of emission-extraction efficiency, and more preferably 0.01 to 0.2 μm.

The reflection layer related to the invention may be formed by any method known in the art, including, for example, a sputtering treatment by use of the foregoing raw material.

Protective Layer for Metal Reflection Layer

The scintillator panel related to the invention may be provided, on the foregoing reflection layer, with a protective layer to protect the metal reflection layer.

Such protective layer for metal reflection layer is formed preferably by coating a resin dissolved in a solvent and drying it A polymer exhibiting a glass transition point of 30 to 100° C. is preferred in terms of adhesion of deposited crystals to a support (substrate) and specific examples of such a polymer include a polyurethane, vinyl chloride copolymer, poly[(vinyl chloride)-co-(vinyl acetate)], poly[(vinyl chloride)-co-(vinylidene chloride)], poly[(vinyl chloride)-co-acrylonitrile], poly(butadiene-co-acrylonitrile), polyvinyl acetal, polyester, cellulose derivatives (e.g., nitrocellulose), polyimide, polyamide, poly-p-xylylene, poly(styrene-co-butadiene), various synthetic rubber resins, phenol resin, epoxy resin, urea resin, melamine resin, phenoxy resin, silicone resin, acryl resin and urea formamide resin. Of these, a polyester resin is preferred.

The thickness of a protective layer for metal reflection layer is preferably not less than 0.1 μm in terms of adhesive property and not more than 3.0 μm to achieve smoothness of the protective layer surface, and more preferably is in the range of 0.2 to 2.5 μm.

Examples of a solvent used for the protective layer for metal reflection layer include a lower alcohol such as methanol, ethanol, n-propanol or n-butanol; a chlorine-containing hydrocarbon such as methylene chloride or ethylene chloride; a ketone such as acetone, methyl ethyl ketone or methyl isobutyl ketone; an aromatic compound such as toluene, benzene, cyclohexane, cyclohexanone or xylene; an ester of a lower carboxylic acid and a lower alcohol, such as methyl acetate, ethyl acetate or butyl acetate; an ether such as dioxane, ethylene glycol monoethyl ester, or ethylene glycol monomethyl ester; and an ether such as dioxane, ethylene glycol monoethyl ester, or ethylene glycol monomethyl ester.

Sublayer:

In the invention, it is preferred in terms of adhesion to provide a sublayer between the support (substrate) and the phosphor layer, or between a reflection layer and a phosphor layer. Such a sublayer preferably contains a polymeric binder (binder), a dispersing agent or the like. The thickness of a sublayer is preferably from 0.5 to 4 μm. There will be further described constituents of a sublayer.

Polymeric Binder:

The sublayer related to the invention is formed preferably by coating a polymeric binder (hereinafter, also denoted simply as a binder) dissolved or dispersed in a solvent, followed by drying. Specific examples of such a polymeric binder include a polyurethane, vinyl chloride copolymer, poly[(vinyl chloride)-co-(vinyl acetate)], poly[(vinyl chloride)-co-(vinylidene chloride)], poly[(vinyl chloride)-co-acrylonitrile], poly(butadiene-co-acrylonitrile), polyvinyl acetal, polyester, cellulose derivatives (e.g., nitrocellulose), polyimide, polyamide, poly-p-xylylene, poly(styrene-co-butadiene), various synthetic rubber resins, phenol resin, epoxy resin, urea resin, melamine resin, phenoxy resin, silicone resin, acryl resin and urea formamide resin. Of these, it is preferred to employ a polyester, a vinyl chloride copolymer, polyvinyl butyral or nitrocellulose.

The polymeric binder related to the invention preferably is a polyester, a vinyl chloride copolymer, polyvinyl butyral or nitrocellulose, in terms of adhesion. A polyester resin is specifically preferred.

Examples of a solvent for use in preparation of a sublayer include a lower alcohol such as methanol, ethanol, n-propanol or n-butanol; a chlorine-containing hydrocarbon such as methylene chloride or ethylene chloride; a ketone such as acetone, methyl ethyl ketone or methyl isobutyl ketone; an aromatic compound such as toluene, benzene, cyclohexane, cyclohexanone or xylene; an ester of a lower carboxylic acid and a lower alcohol, such as methyl acetate, ethyl acetate or butyl acetate; an ether such as dioxane, ethylene glycol monoethyl ester, or ethylene glycol monomethyl ester; and an ether such as dioxane, ethylene glycol monoethyl ester, or ethylene glycol monomethyl ester.

The sublayer related to the invention may contain a pigment of a dye to inhibit scattering of light emitted from a phosphor (scintillator) to achieve enhanced sharpness.

Protective Layer:

A protective layer related to the invention mainly aims to protect a scintillator layer. Namely, cesium iodide (CsI) is a hygroscopic material, and absorbs moisture from the atmosphere to deliquesce so that it is a main aim to inhibit this.

The moisture-resistant protective layer can be formed by use of various materials. For instance, it is to form a p-xylilene membrane by a CVD process. Namely, it is to form a p-xylilene layer on all of the surfaces of a scintillator and a substrate, where a protective layer is formed.

Alternatively, a polymer film, as a protective layer, may be provided on the phosphor layer. A material of such a polymer film may employ a film similar to a polymer film as a support (substrate) material, as described later.

The thickness of a polymer film is preferably not less than 12 μm and not more than 120 μm, and more preferably not less than 20 μm and not more than 80 μm, taking into account formability of void portions, protectiveness of a phosphor layer, sharpness, moisture resistance and workability. Taking into account sharpness, uniformity of radiation image, production stability and workability, the haze factor is preferably not less than 3% and not more than 40%, and more preferably not less than 3% and not more than 10%. The haze factor is determined by using, for example, NDH 500W, made by Nippon Denshoku Kogyo Co., Ltd. Such a haze factor can be achieved by choosing commercially available polymer films.

Taking into account photoelectric conversion efficiency and scintillator emission wavelength, the light transmittance of the protective film is preferably not less than 70% at 550 nm; however, a film with light transmittance of 99% or more is not commercially available, so that it is substantially preferred to be from 70 to 99%.

Taking into account protectiveness and deliquescence of a scintillator layer, the moisture permeability of the protective film is preferably not more than 50 g/m$^2$·day (40° C., 90% RH, measured in accordance with JIS Z 0208) and more preferably not more than 10 g/m$^2$·day (40° C., 90% RH, measured in accordance with JIS Z 0208); however, a film of not more than 0.01 g/m$^2$·day (40° C., 90% RH) is not commercially available, so that it is substantially preferred to be not less than 0.01 g/m$^2$·day (40° C., 90% RH) and not more than 50 g/m$^2$·day (40° C., 90% RH, measured in accordance with JIS Z 0208), and it is more preferred to be not less than 0.1 g/m$^2$·day (40° C., 90% RH) and not more than 10 g/m$^2$·day (40° C., 90% RH, measured in accordance with JIS Z 0208).

Support (Substrate):

In the invention, a support (also denoted as a substrate) preferably is a quartz glass sheet, a metal sheet such as aluminum, iron, tin or chromium, a carbon fiber-reinforced sheet, or a polymer film.

There are usable polymer films (plastic films) such as cellulose acetate film, polyester film, polyethylene naphthalate (PEN) film, polyamide film, polyimide (PI) film, triacetate film, polycarbonate film and carbon fiber reinforced resin. A polymer film containing a polyimide or polyethylene naphthalate is specifically suitable when forming phosphor columnar crystals with a raw material of cesium iodide by a process of vapor phase deposition.

The support (substrate) related to the invention preferably is a 50-500 μm thick, flexible polymer film.

Herein, the flexible support (substrate) refers to a substrate exhibiting an elastic modulus at 120° C. (also denoted as E120) of 1000 to 6000 N/mm$^2$. Such a substrate preferably is a polymer film containing polyimide or polyethylene naphthalate.

In the region showing a linear relationship between strain and corresponding stress which is measured by using a tensile strength tester based on JIS C 2318, the elastic modulus is calculated as the slope of the straight portion of the stress-strain curve, that is, a strain divided by a stress. It is also referred to as a Young's modulus. In the invention, such a Young's modulus is also defined as the elastic modulus.

The substrate used in the invention preferably exhibits an elastic modulus at 120° C. (E120) of 1000 to 6000 N/mm$^2$, and more preferably 1200 to 5000 N/mm$^2$.

Specific examples include polymer film comprised of polyethylene naphthalate (E120=4100 N/mm$^2$), polyethylene terephthalate (E120=1500 N/mm$^2$), polybutylene naphthalate (E120=1600 N/mm$^2$), polycarbonate (E120=1700 N/mm$^2$), syndiotactic polystyrene (E120=2200 N/mm$^2$), polyether imide (E120=1900 N/mm$^2$), polyacrylate (E120=1700 N/mm$^2$), polysulfone (E120=1800 N/mm$^2$) or polyether sulfone (E120=1700 N/mm$^2$).

These may be used singly or mixedly, or laminated. Of these polymer films, a polymer film comprising polyimide or polyethylene naphthalate is preferred.

Adhesion of the scintillator panel to the surface of a planar light receiving element is often affected by deformation or warpage of the support (substrate) during deposition, rendering it difficult to achieve a uniform image quality characteristic within the light receiving surface of a flat panel detector. In such a case, a 50-500 μm thick polymer film is used as the support (substrate), whereby the scintillator panel is deformed with being fitted to the form of the surface of a planar light receiving element, leading to uniform sharpness over all of the light-receiving surface of the flat panel detector.

The support may be provided with a resin layer to make the surface smooth. The resin layer preferably contains a compound such as a polyimide, polyethylene terephthalate, paraffin or graphite, and the thickness thereof preferably is approximately 5 to 50 μm. The resin layer may be provided on the front surface or back surface of the support.

Means for providing an adhesion layer on the support surface include, for example, a pasting method and a coating method. Of these, the pasting method is conducted by using heat or a pressure roller preferably in the heating condition of approximately 80 to 150° C., a pressure condition of 4.90×10 to 2.94×10$^2$ N/cm and a conveyance rate of 0.1 to 2.0 m/sec.

Production Method of Scintillator Panel:

A production method of the scintillator panel related to the invention is preferably one in which, using an evaporation device having an evaporation source and a support rotation mechanism provided within a vacuum vessel, a support is placed on the rotation mechanism and a phosphor layer is formed by a vapor phase deposition process of evaporating a phosphor material, while rotating the support rotation mechanism.

In the following, there will be described the embodiments of the invention with reference to FIG. 1.

FIG. 1 illustrates a schematic constitution of a production device of a scintillator panel related to the invention. As illustrated in FIG. 1, a vapor production device 1 of a radiation scintillator is provided with a vacuum vessel 2. The vacuum vessel 2 is provided with a vacuum pump 3 to evacuate the inside of the vacuum vessel 2 and to introduce atmosphere.

A support holder 5 to hold a support 4 is provided near the topside within the vacuum vessel 2.

A phosphor layer is formed on the surface of the support 4 by a process of vapor phase deposition. The process of vapor phase deposition may employ a vapor deposition method, a sputtering method, a CVD method, an ion-plating method or the like, of which the vapor deposition method is preferred in the invention.

A holder 5 supports the substrate 1 so that the support surface to form the phosphor layer is opposed to and is also parallel to the bottom face of the vacuum vessel 2.

The support holder 5 is preferably provided with a heater (which is not shown in the drawing) to heat the support 4. Heating the substrate by the heater achieves enhanced contact of the substrate to the support holder 5 and controls layer quality of the phosphor layer. Further, adsorbate on the surface of the support 4 is also eliminated or removed to inhibit generation of an impurity layer between the surface of the support 4 and a phosphor described later.

Further, there may be provided, as a heating means, a mechanism (not shown in the drawing) to circulate a warming medium or heating medium. Such a means is suitable when performing vapor deposition with maintaining the support 4 at a relatively low temperature of 50 to 150° C.

There may be provided a halogen lamp (not shown in the drawing) as a heating means. This means is suitable when performing vapor deposition with maintaining the support 4 at a relatively high temperature of not less than 150° C.

The support holder 5 is provided with a rotation mechanism 6 to rotate the support 4 in the horizontal direction. The support rotation mechanism 6 is constituted of a support rotation shaft 7 to rotating the support 4 with supporting the support holder 5 and a motor (not shown in the drawing) which is disposed outside the vacuum vessel and is a driving source of the support rotation shaft 7.

In the vicinity of the bottom surface within the vacuum vessel 2, evaporation sources 8a and 8b are disposed at positions opposed to each other on the circumference of a circle centered on a center line vertical to the support 4. In that case, the distance between the support 4 and the evaporation source 8a or 8b is preferably from 100 to 1500 mm, and more preferably from 200 to 1000 mm. Further, the distance the center line vertical to the substrate 1 and the evaporation source 8a or 8b is preferably from 100 to 1500 mm, and more preferably from 200 to 1000 mm.

The radiation scintillator production device may be provided with three or more evaporation sources, in which the individual evaporation sources may be disposed at equivalent intervals or different intervals. The radius of a circle centered on a center line vertical to the support 4 can arbitrarily be set.

The evaporation sources 8a and 8b, which house a phosphor and heat it by a resistance heating method, may be constituted of an alumina crucible wound by a heater, a boat or a heater of a metal with a high melting point. Methods of heating a phosphor include heating by an electron beam and high-frequency induction heating, but in the invention, a method of resistance-heating by direct current or a method of resistance-heating indirectly a crucible by a circumferential heater is preferable in terms of ease of operation by a relatively simple constitution and low price and also being applicable to many substances. The evaporation sources 8a and 8b may be a molecular beam by a molecular source epitaxial method.

A shutter 9 which is openable in the horizontal direction is provided between the evaporation source 8a or 8b) and the substrate 1 to intercept the space from the evaporation source 8a) or 8b to the support 4; this shutter 9 prevents substances except the objective material which were attached to the phosphor surface and have been evaporated at the initial stage of vapor deposition from adhering onto the support 4.

Production Method of Scintillator Panel:

Next, there will be described a production method of a scintillator panel related to the invention by using the foregoing production device 1 of the foregoing scintillator panel.

First, the support 4 is placed onto the support holder 5. Further, evaporation sources 8a and 8b are disposed on the circumference of a circle centered on a center line vertical to the substrate 1 in the vicinity of the bottom of the vacuum vessel 2. In that case, the space between the substrate 1 and the evaporation source 8a or 8b is preferably form 100 to 1500 mm, and more preferably from 200 to 1000 mm. The space between the center line vertical to the support 4 is preferably from 100 to 1500 mm, and more preferably from 200 to 1000 mm.

Subsequently, the inside of the vacuum vessel 2 is evacuated to a medium evacuation degree of an extent of $1\times10^{-2}$ to 10 Pa, and preferably to a evacuation degree of $1\times10^{-2}$ to 1 Pa. More preferably, the inside of the vacuum vessel 2 is evacuated to a high evacuation degree of $1\times10^{-5}$ to $1\times10^{-2}$ Pa, and then, is controlled to the foregoing medium evacuation degree, while introducing an inert gas such as Ar gas, Ne gas, $N_2$ gas or the like.

Then, while rotating the support holder 5 by the support rotation mechanism 6 with respect to the evaporation sources 8a and 8b, the phosphor is evaporated from the heated evaporation sources 8a and 8b to allow the phosphor to grow on the surface of the support 4 to an intended thickness. Thereby, a water partial pressure or an oxygen partial pressure within the device can be lowered. An evacuation device can employ an appropriate combination of a rotary pump, a turbo pump, a cryopump, a diffusion pump, a mechanical booster and the like.

The process of growing a phosphor on the surface of the support 4 may be divided to plural steps to form a phosphor layer.

In the vapor deposition method, a material subject to deposition (the support 4, protective layer or intermediate layer) may appropriately be heated or cooled during vapor deposition.

After completing vapor deposition, the phosphor layer may be subjected to a heating treatment. There may be also conducted a reactive deposition in which deposition is performed, while introducing gas such as $O_2$ or $H_2$.

The thickness of the formed phosphor layer, which is different depending on intended use or the kind of a phosphor, is from 50 to 2000 μm, preferably 50 to 1000 μm, and more preferably from 100 to 800 μm.

The temperature of the support 4 on which a phosphor layer is to be formed, is set preferably to the range of room temperature (rt) to 300° C., and more preferably 50 to 250° C.

After forming the phosphor layer, a protective layer to physically or chemically protect the phosphor layer may be provided on the phosphor layer opposite to the support 4. A coating solution for a protective layer may be directly coated onto the phosphor layer surface or a protective layer which was previously formed may be adhered to the phosphor layer. The thickness of such a protective layer is preferably from 0.1 μm to 2000 μm.

Alternatively, a protective layer may be formed by depositing an inorganic substance such as SiC, $SiO_2$, SiN or $Al_2O_3$ through a vapor deposition method, sputtering method or the like.

In the invention, there may be provided various functional layers other than the protective layer.

In the production device 1 for a scintillator panel or the production method thereof, plural evaporation sources 8a and 8b are provided, whereby the overlapping portion of vapor streams from evaporation sources 8a and 8b are straightened, resulting in uniform crystallinity of a phosphor deposited on the surface of the support 4. In that case, more evaporation sources are provided, vapor streams are straightened at a larger number of portions, resulting in uniform crystallinity over a broader region. Further, when evaporation sources 8a and 8b are disposed on the circumference of a circle centered on a center line vertical to the support 4, such an action of unifomalizing crystallinity by straightening vapor streams can be isotropically achieved on the surface of the support 4.

Further, performing deposition of a phosphor with rotating the support 4 by the support rotation mechanism 6 can achieve uniform deposition of the phosphor on the surface of the support 4.

In the production device 1 or the production method of the scintillator panel related to the invention, as described above, the phosphor layer is allowed to grow so that the crystallinity of the phosphor becomes uniform, thereby achieving enhanced sharpness in the radiation image obtained from the radiation image conversion panel by using the scintillator panel related to the invention.

Further, restriction of the incident angle of the foregoing phosphor to be deposited on the support 4 to the prescribed region to inhibit fluctuation in the incident angle of the phosphor results in uniformity crystallinity of the phosphor and enhanced sharpness of the obtained radiation image.

In the foregoing, there are described cases when the support holder 5 is provided with the support rotation mechanism 6, but the invention is not limited to these but is also applicable to those cases, including, for example, the case of performing evaporation, while the support holder 5 holding the support 4 at rest; and the case of depositing the phosphor from the evaporation source 8a or 8b, while the support 4 is in the horizontal direction to the evaporation source 8a or 8b.

Radiation Image Conversion Panel:

The radiation image conversion panel of the invention (also denoted as a radiation image detector or radiation flat panel detector) may be obtained by adhering or contacting a scintillator panel which is provided with a phosphor layer formed on the first substrate by the vapor phase deposition process through a functional layer such as a reflection layer, to a photoelectric conversion panel provided, on the second substrate, with a photoelectric conversion element section (or planar light receiving element) in which picture elements comprised of a photosensor and a TFT (Thin Film Transistor) or CCD (Charge Coupled Device) are two-dimensionally arranged. Alternatively, it may be obtained by forming the photoelectric conversion element section in which picture elements comprised of a photosensor and a TFT or CCD are two-dimensionally arranged, followed by providing the phosphor layer by the process of vapor phase deposition directly or through a functional layer such as a protective layer.

Namely, the radiation image conversion panel of the invention is required to be one which is provided, as a basic constitution, with a phosphor layer and a light-receiving element (hereinafter, also denoted as a planar light-receiving element) in which plural light-receiving elements are two-dimensionally arranged. Accordingly, the planar light-receiving element converting emission from the phosphor layer to a charge makes it feasible to digitize the image data.

The surface mean roughness (Ra) of the planar light receiving element related to the invention is preferably within the range of 0.001 to 0.5 μm. Accordingly, it is preferred that after forming a light-receiving element on the glass surface, an organic resin film such as polyester of acryl is formed on the surface and the surface roughness is controlled by a photo-etching method so that the relevant requirements are met. The surface mean roughness (Ra) of the planar light receiving element related to the invention is preferably 0.001 to 0.1 μm, and more preferably 0.001 to 0.05 μm.

The radiation image conversion panel of the invention is preferably in the form of a scintillator panel being contactably pressed to a planar light-receiving element by an elastic member (such as a sponge, spring or the like). It is also a preferred embodiment that the scintillator panel is brought into contact with the planar light-receiving element by evacuating the space between the scintillator panel and the planar light-receiving element and the circumference is sealed with an adhesive sealing member. Such an adhesive sealing member preferably is an ultraviolet-curable resin.

It is also a preferred embodiment that the scintillator panel is provided with a phosphor layer and the phosphor layer is directly in contact with a planar light-receiving element.

Such ultraviolet-curable resins are not specifically restricted but can be selected appropriately from those known in the art. These ultraviolet-curable resins contain a photopolymerizable prepolymer or photopolymerizable monomer and a photopolymerization initiator or a photosensitizer.

Examples of such a photopolymerizable prepolymer include a polyester-acrylate one, an epoxy-acrylate one, a urethane acrylate one and a polyol-acrylate one. These photopolymerizable pre-polymers may be used singly or in combination. Examples of a photopolymerizable monomer include polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythriltol hexa(meth)acrylate, 1,6-hexanediol di(meth)acrylate, and neopentyl glycol di(meth)acrylate.

In the invention, there are preferably used a urethane acrylate prepolymer and a dipentaerythritol hexa(meth)acrylate monomer.

Examples of a photopolymerization initiator include acetophenones, benzophenones, α-amyloxime ester, tetramethyl thiurum monosulfide, and thioxanthones. Further, n-butylamine, triethylamine and poly-n-butylphosphine are mixedly used as a photosensitizer.

EXAMPLES

The present invention will be further described with reference to examples but the invention is by no means limited to these.

A scintillator panel was prepared in the following manner by using a production device shown in FIG. 1. By use thereof, a radiation image conversion panel was prepared and evaluated.

Comparison 1

Preparation of Scintillator Panel:

Phosphor raw material 1 (CsI: 0.01 mole TlI) and phosphor raw material 2 (CsI: 0.01 mole TlI) were vapor-deposited, on one surface side of a support comprised of a polyimide resin sheet, to form a phosphor layer. Specifically, first, a support is placed on a support holder provided with a support rotation mechanism. Then, the foregoing phosphor raw materials were respectively placed in a single evaporation source crucible (two crucibles in total). Two evaporation source crucibles were disposed in the vicinity of the bottom of the vacuum vessel and on the circumference of a circle centered on a center line vertical to the support. The distance between the support and the evaporation source was adjusted to 400 mm and the distance between the center line vertical to the support and the evaporation source was also adjusted to 400 mm. Subsequently, after the interior of the vacuum vessel was evacuated to $1 \times 10^{-3}$ Pa, the vacuum degree was adjusted to $1 \times 10^{-2}$ Pa, while introducing Ar gas and the temperature of the support was maintained at 30° C., while rotating the support at a rate of 10 rpm. Subsequently, the interior of the individual crucible was raised to a prescribed temperature by resistance heating. Subsequently, evaporation of the phosphor raw material 1 was initiated with rotating the support and when the thickness of a phosphor layer reached 10 μm, evaporation was terminated. Subsequently, after the evacuation degree was adjusted to 0.1 Pa and the temperature of the support (substrate) was raised to 200° C., the phosphor raw material 2 was evaporated. When the thickness of a phosphor layer reached 450 μm, evaporation was terminated. Subsequently, the phosphor layer was placed into a protective bag in a dry air atmosphere to obtain a scintillator panel with the structure of the phosphor layer being sealed. The relative densities of a phosphor layer and a base layer, and a relative activator content were the values shown in Table 1.

Comparison 2

A scintillator panel shown in Table 1 was obtained in the same manner as the foregoing Comparison 1, except that the vacuum degree adjusted to $1 \times 10^{-2}$ Pa with introducing Ar gas was changed to 0.1 Pa, whereby a scintillator was obtained, as shown in Table 1. The relative densities of a phosphor layer and a base layer, and the relative activator content were the values shown in Table 1.

A scintillator panel was obtained in the same manner as the foregoing Comparison 2, except that the phosphor raw material 1 was changed to only CsI. The relative densities of a phosphor layer and a base layer, and a relative activator content were the values shown in Table 1.

Example 1

A scintillator panel was obtained in the same manner as the foregoing Comparison 2, except that the phosphor raw material 1 was changed to (CsI: 0.001 mol TlI). The relative densities of a phosphor layer and a base layer, and a relative activator content were the values shown in Table 1.

Example 2

A scintillator panel was obtained in the same manner as the foregoing Example 1, except that the phosphor raw material 1 was changed to (CsI: 0.005 mol TlI). The relative densities of a phosphor layer and a base layer, and a relative activator content were values shown in Table 1.

Example 3

A scintillator panel was obtained in the same manner as the foregoing Example 1, except that the phosphor raw material 1 was changed to (CsI: 0.007 mol TlI). The relative densities of a phosphor layer and a base layer, and a relative activator content were the values shown in Table 1.

Example 4

A scintillator panel was obtained in the same manner as the foregoing Example 2, except that the base layer thickness was changed to 20 μm. The relative densities of a phosphor layer and a base layer, and a relative activator content were the values shown in Table 1.

Example 5

A scintillator panel was obtained in the same manner as the foregoing Example 2, except that the base layer thickness was changed to 20 μm and evaporation was terminated when the thickness of the phosphor layer reached 180 μm. The relative densities of a phosphor layer and a base layer, and a relative activator content were the values shown in Table 1.

Example 6

A scintillator panel was obtained in the same manner as the foregoing Example 2, except that the evacuation degree was changed from 0.1 Pa to 0.15 Pa. The relative densities of a phosphor layer and a base layer, and a relative activator content were the values shown in Table 1.

Evaluation

Of the obtained scintillator panels, each was set to Pax Scan (FPD:250, made by Varian) and evaluated as below.

Evaluation of Luminance:

Samples were each exposed to X-rays at a voltage of 80 kVp from the back surface (not forming a scintillator layer) and the image data were detected by the FDP disposed with the scintillator panel, and the average signal value of the image was defined as the emission luminance. The thus obtained luminance was presented by a relative value, based on the luminance of a radiation image conversion panel of Comparison 1 being 100. A higher MTF value indicates superior luminance.

Evaluation of Sharpness:

The FPD was exposed to X-rays at a tube voltage of 80 kVp through a lead MTF chart and the image data was recorded on a hard disc. Then, the record on the hard disc was analyzed by a computer to determine a modulation transfer function, MTF [MTF value (%) at a spatial frequency cycle of 1/mm], which was a measure of sharpness. The obtained MTF was represented by a relative value, based on the MTF of the radiation conversion panel of Comparison 1 being 100. A higher MTF value indicates superior sharpness. "MTF" is the abbreviation for Modulation Transfer Function.

Evaluation of Moisture Resistance:

The obtained scintillator panels were allowed to stand in an environment of 70° C. and 90% RH and the deteriorated moisture resistance was represented by a relative value, based on the value before being allowed to stand being 100.

TABLE 1

| | Phosphor Raw Material 1 Composition (molar ratio) | Phosphor Raw Material 2 Composition (molar ratio) | Relative Activator Content of Base Layer (molar %) | Relative Activator Content of Phosphor Layer (molar %) | Thickness of Base Layer (μm) | Relative Density of Base Layer (%) | Relative Density of Phosphor Layer (%) | Luminance [—] | MTF [—] | MTF after Storage [—] |
|---|---|---|---|---|---|---|---|---|---|---|
| Comparison 1 | CsI:0.01TlI | CsI:0.01TlI | 1.0 | 1.0 | 10 | 99 | 90 | 100 | 100 | 100 |
| Comparison 2 | CsI:0.01TlI | CsI:0.01TlI | 1.0 | 1.0 | 10 | 85 | 90 | 97 | 102 | 97 |
| Comparison 3 | CsI alone | CsI:0.01TlI | — | 1.0 | 10 | 85 | 90 | 95 | 112 | 80 |
| Example 1 | CsI:0.001TlI | CsI:0.01TlI | 0.1 | 1.0 | 10 | 85 | 90 | 102 | 110 | 101 |
| Example 2 | CsI:0.005TlI | CsI:0.01TlI | 0.5 | 1.0 | 10 | 85 | 90 | 110 | 107 | 103 |
| Example 3 | CsI:0.007TlI | CsI:0.01TlI | 0.7 | 1.0 | 10 | 85 | 90 | 120 | 103 | 102 |
| Example 4 | CsI:0.005TlI | CsI:0.01TlI | 0.5 | 1.0 | 20 | 85 | 90 | 115 | 112 | 102 |
| Example 5 | CsI:0.005TlI | CsI:0.01TlI | 0.5 | 1.0 | 20 | 85 | 90 | 110 | 114 | 104 |
| Example 6 | CsI:0.005TlI | CsI:0.01TlI | 0.5 | 1.0 | 10 | 85 | 88 | 108 | 106 | 103 |

As is apparent from the results shown in Table 1, it was proved that any of scintillator panels of the present invention (Examples 1-4) was excellent in luminance and MTF and improved in deterioration of MTF after storage.

It was also proved that luminance, MTF and MTF after being stored were deteriorated in cases when the relative density of the base layer was higher than that of the phosphor layer, a base layer was comprised of CsI alone, or the Tl content of a base layer was the same as that of a phosphor layer (Comparison 1-3).

DESCRIPTION OF THE NUMERALS

1: Production device of scintillator panel
2: Vacuum vessel
3: Vacuum pump
4: Support
5: Support holder
6: Support rotation mechanism
7: Support rotation shaft
8: Evaporation source
9: Shutter

What is claimed is:

1. A scintillator panel comprising on a support a base layer and a phosphor layer provided sequentially in this order, wherein the phosphor layer comprises columnar phosphor crystals formed of a phosphor parent compound and an activator by a process of vapor phase deposition and the base layer comprises crystals formed of the phosphor parent compound and the activator, and a relative density of the base layer is lower than a relative density of the phosphor layer and a relative content of the activator of the base layer is lower than a relative content of the activator of the phosphor layer, provided that the relative content of the activator of the base layer is 0.1 to 0.7 mole % and the relative content of the activator of the phosphor layer is 0.1 to 5 mole %.

2. The scintillator panel, as claimed in claim 1, wherein a thickness of the base layer satisfies the following expression:

Expression 0.01<[(thickness of base layer)/(thickness of phosphor layer)]<0.5.

3. The scintillator panel, as claimed in claim 1, wherein the base layer is a layer comprising crystals formed by a process of vapor phase deposition.

4. The scintillator panel, as claimed in claim 1, wherein the phosphor parent compound is cesium iodide (CsI) and the activator is thallium (Tl).

5. A method of preparing a scintillator panel comprising on a support a base layer and a phosphor layer, the method comprising:
  depositing a phosphor parent compound and an activator on the base layer by a process of vapor phase deposition to form the phosphor layer comprised of columnar phosphor crystals,
  wherein the base layer comprises crystals comprised of the phosphor parent compound and the activator, and a relative density of the base layer is lower than a relative density of the phosphor layer and a relative content of the activator of the base layer is lower than a relative content of the activator of the phosphor layer, provided that the relative content of the activator of the base layer is 0.1 to 0.7 mole % and the relative content of the activator of the phosphor layer is 0.1 to 5 mole %.

6. The method, as claimed in claim 5, wherein a thickness of the base layer satisfies the following expression:

Expression 0.01<[(thickness of base layer)/(thickness of phosphor layer)]<0.5.

7. The method, as claimed in claim 5, wherein the base layer is a layer comprising crystals formed by a process of vapor phase deposition.

8. The method, as claimed in claim 5, wherein the phosphor parent compound is cesium iodide (CsI) and the activator is thallium (Tl).

* * * * *